No. 897,418. PATENTED SEPT. 1, 1908.
A. J. SHERIDAN.
FILTER.
APPLICATION FILED NOV. 29, 1907.
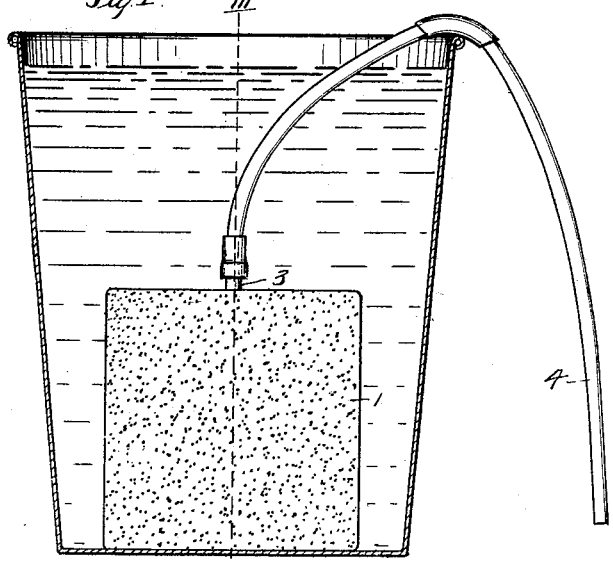
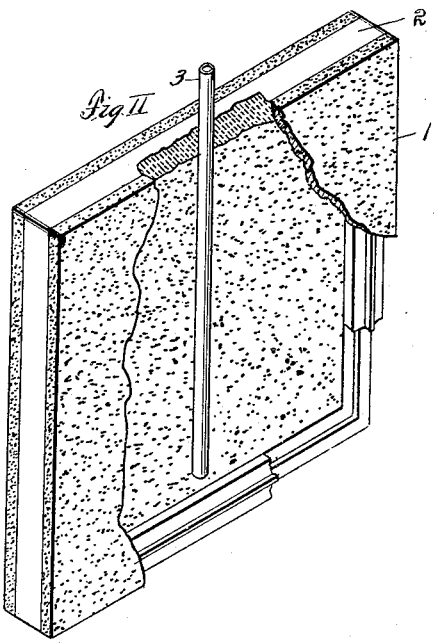
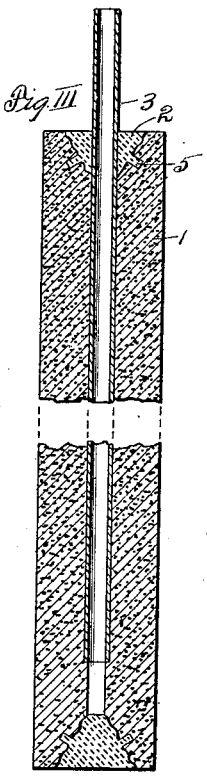
WITNESSES:
R. E. Hamilton
L. R. Hawey
INVENTOR.
Andrew J. Sheridan
BY
Arthur C. Brown
ATTORNEY.

UNITED STATES PATENT OFFICE.

ANDREW J. SHERIDAN, OF KANSAS CITY, KANSAS, ASSIGNOR TO JAMES O. WILSON, OF KANSAS CITY, MISSOURI.

FILTER.

No. 897,418.      Specification of Letters Patent.      Patented Sept. 1, 1908.

Application filed November 29, 1907. Serial No. 404,367.

*To all whom it may concern:*

Be it known that I, ANDREW J. SHERIDAN, a citizen of the United States, residing at Kansas City, in the county of Wyandotte and State of Kansas, have invented certain new and useful Improvements in Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to filters, and has for its object to provide a device of that class which is simple and economical in construction, and which will comprise the improved details of structure pointed out in the claims, and shown in the accompanying drawings, in which latter—

Figure I is a view in central vertical section of a vessel containing a filter constructed according to my invention. Fig. II is a perspective view of the filter body, with a portion of one of the stones broken away for better illustration. Fig. III is a vertical sectional view on the line III—III, Fig. I.

Referring more in detail to the parts—1 represents the filtering stones, two of which are united by cementing their outer edges together to form the filtering body; the cement union forming a spreader for stones 1, to provide a central chamber therebetween.

Projecting through the cement union into the central water chamber is a tube 3, and telescoping onto tube 3 is a conducting tube 4, preferably of flexible material.

In joining the filter parts together, I prefer to bevel the edges of the stones as shown, and to provide grooves in said beveled edges for receiving the cement, so that when hardened, the fingers 5 of the union 2 will hold to the stones and prevent the escape of the cement, should the latter become loosened.

When in use, the filter with the tube attached is placed in a vessel containing water, and a suction created through the tube, which tends to draw the water in through the porous stone sides to the central chamber, and thence outwardly through the flexible tube, the water leaving its impurities with the filtering stones during its passage therethrough.

Having thus described my invention, what I claim as new therein and desire to secure by Letters-Patent is,—

1. A filter comprising side portions of filtering material, having beveled edges, provided with longitudinal grooves, said side portions being cemented together at their edges in a manner to provide a filter body, having a central chamber, and a tube projecting through the body into said chamber.

2. A filter comprising side portion of filtering material, having beveled edges provided with longitudinal grooves, a cement body set between said edges and within said grooves, and spreading said side portions apart to form a central chamber, and a tube extending through said cement body into said chamber.

In testimony whereof I affix my signature in presence of two witnesses.

ANDREW J. SHERIDAN.

Witnesses:
     J. T. ALLBRITAIN,
     ARTHUR C. BROWN.